P. KLUMB.
SELF FEEDER FOR ENSILAGE AND SILO CUTTERS.
APPLICATION FILED MAY 14, 1910.
1,129,992.
Patented Mar. 2, 1915.
3 SHEETS—SHEET 3.
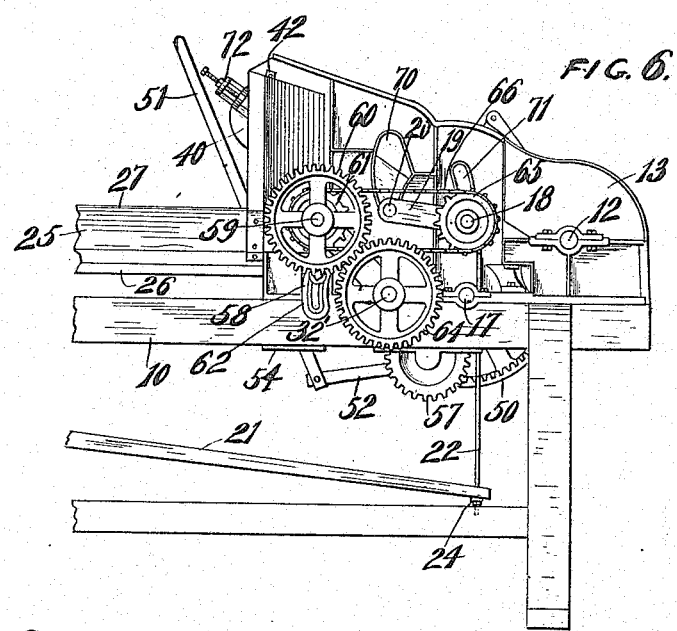
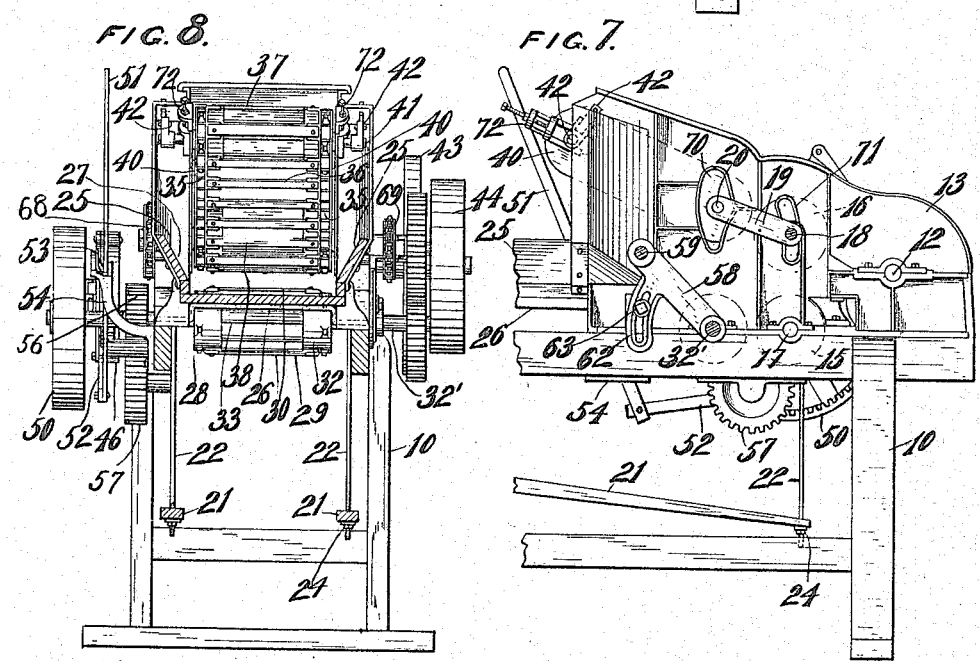
WITNESSES.
INVENTOR.
Paul Klumb,
Benedict, Morsell & Caldwell.
ATTORNEYS.

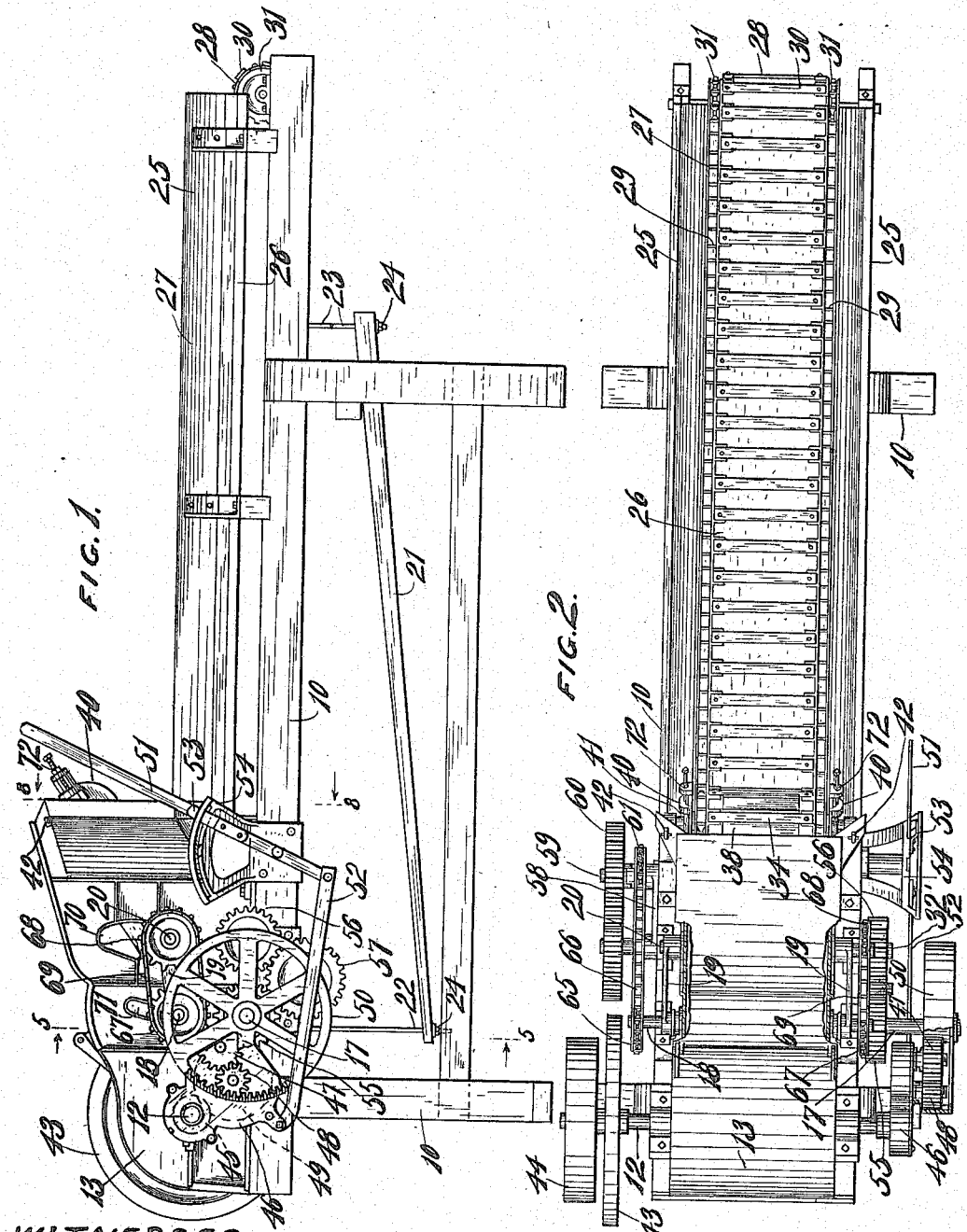

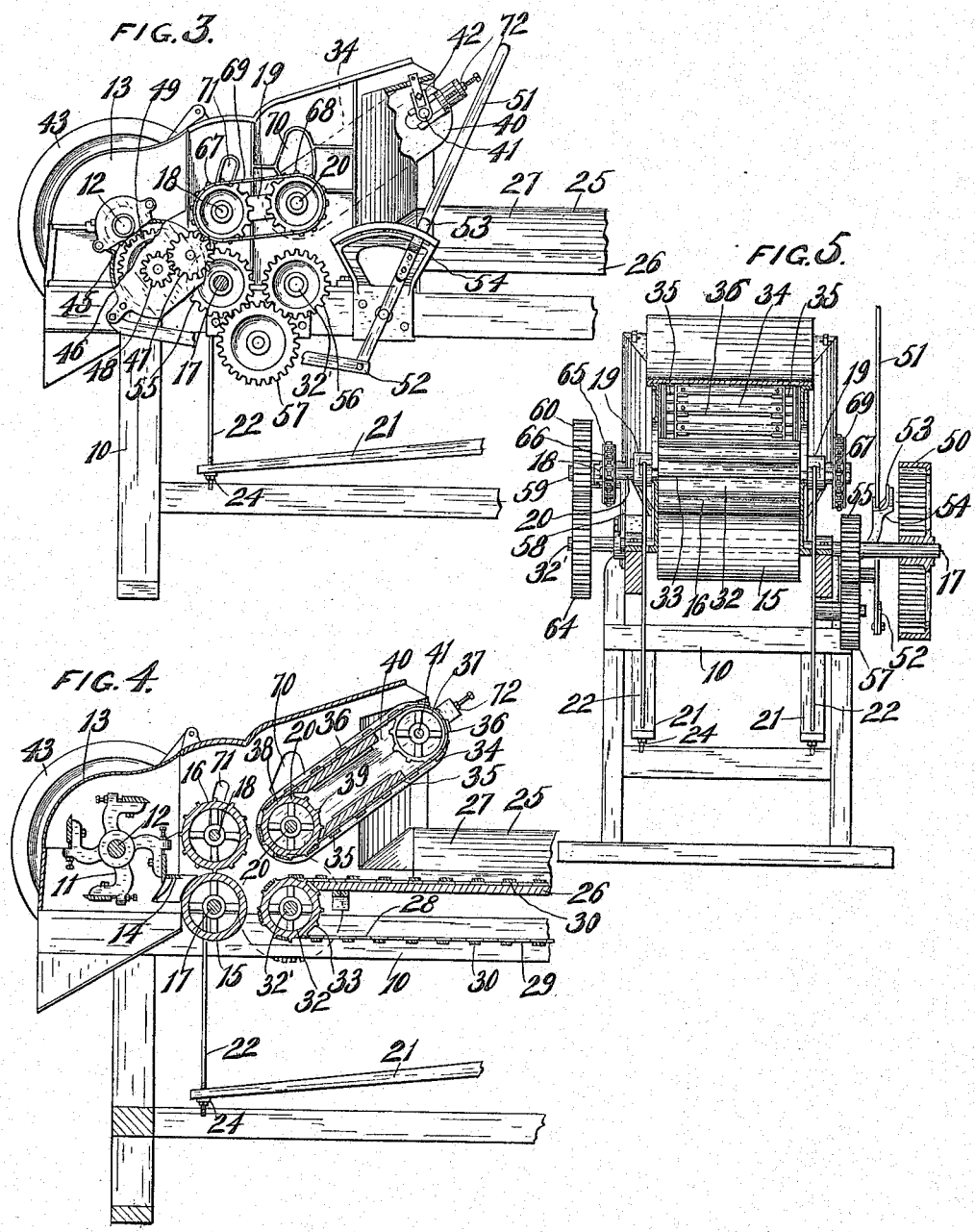

UNITED STATES PATENT OFFICE.

PAUL KLUMB, OF SHEBOYGAN, WISCONSIN, ASSIGNOR TO GLOBE FOUNDRY & MACHINE COMPANY, OF SHEBOYGAN, WISCONSIN, A CORPORATION OF WISCONSIN.

SELF-FEEDER FOR ENSILAGE AND SILO CUTTERS.

1,129,992.     Specification of Letters Patent.     Patented Mar. 2, 1915.

Application filed May 14, 1910. Serial No. 561,305.

*To all whom it may concern:*

Be it known that I, PAUL KLUMB, residing in Sheboygan, in the county of Sheboygan and State of Wisconsin, have invented new and useful Improvements in Self-Feeders for Ensilage and Silo Cutters, of which the following is a description, reference being had to the accompanying drawings, which are a part of this specification.

This invention relates to improvements in self-feeders for ensilage and silo cutters, and has for one of its objects to provide a feeder which does not require the close proximity of the operator to the cutting knives in supplying material to the feeder and thereby safeguarding the operator from accidental injury.

A further object of the invention is to provide a self-feeder which is provided with means whereby the direction of rotation of the moving parts may be quickly and momentarily reversed to prevent the clogging of the feeder when an excess amount of material is fed to the machine.

A further object of the invention is to provide a self-feeder which will automatically accommodate itself to engage a greater or less amount of material fed to the machine.

A further object of the invention is to construct a self-feeder which is provided with means for feeding, compressing and moving material into the path of movement of the feed cutter in an efficient manner and which is simple in construction and operation and is inexpensive to manufacture and maintain.

A further object of the invention is to construct a self-feeder with endless conveyers between which the material is fed and to so construct one of the conveyers that it will yieldingly hold the material in engagement with the other conveyer.

With the above, and other objects in view, the invention consists of the self-feeder and its parts and combinations, as set forth in the claims, and all equivalents thereof.

In the accompanying drawings in which the same reference characters indicate the same parts in all of the views, Figure 1 is a side view of an ensilage and silo cutter provided with the improved self-feeder, a part broken away to show other parts in the rear thereof; Fig. 2 is a plan view thereof, parts being broken away to show interior construction; Fig. 3 is a side view of a portion of the cutter and feeder, parts broken away and other parts removed; Fig. 4 is a vertical longitudinal sectional view of a portion of the cutter and feeder; Fig. 5 is a transverse sectional view thereof taken on line 5—5 of Fig. 1; Fig. 6 is a view of a portion of the cutter and feeder looking at the opposite side of the machine; Fig. 7 is a similar view thereof with parts removed and other parts adjusted in a different position; and Fig. 8 is a transverse sectional view taken on lines 8—8 of Fig. 1.

Referring to the drawing the numeral 10 indicates the main frame of the ensilage and silo cutter which is provided with the usual revoluble cutter 11 mounted on the drive shaft 12 and inclosed in the casing 13 and positioned to engage the stationary cutter 14 rigidly connected to the frame. Two feed and compression rollers 15 and 16 respectively are positioned immediately in front of the cutters and serve to compress and feed the material to the cutters. The lower feed roller 15 is carried by a shaft 17 journaled in a fixed portion of the frame and the upper roller 16 is carried by a shaft 18 journaled in links 19 which are pivotally connected to an apron shaft 20. The upper feed roller is longitudinally ribbed and is yieldingly and adjustably held in engagement with the lower roller by means of spring lever bars 21 which are connected to the links 19 by rods 22 and at points near their opposite ends are fulcrumed against a transverse portion of the main frame and their ends are connected to the main frame by bolts 23. The bolts 23 and the rods 22 are provided with nuts 24 threaded thereto to adjust the tension of said spring bars.

The main frame is constructed with flaring side pieces 25 and a bottom piece 26 forming a feed trough 27 through which extends the upper portion of an endless conveyer 28 which is adapted to feed material to the compression and feed rollers 15 and 16. The endless conveyer 28 which is formed of side chains 29 joined together by transverse slats 30 is carried on sprocket wheels 31 mounted on the outer end of the frame and on a drum 32 rigidly mounted on a shaft 32' which is journaled within the casing of the frame. The drum serves to prevent the material from falling through the spaces between the transverse slats and is recessed longitudinally to accommodate the slats and to form ribs 33 which assist in feeding the material into the machine.

A floating endless feed apron 34 positioned at an angle above the inner end of the endless conveyer 28 is adapted to assist in drawing the material into the machine and at the same time compress or flatten it so it will easily pass between the compression rolls 15 and 16. The endless conveyer 34 is also formed of side sprocket chains 35 joined together by transverse slats 36 and is carried on drums 37 and 38. These drums also form a solid backing for the conveyer slats and are provided with longitudinal recesses to accommodate the said slats and also form ribs 39 to engage and move the material.

A swinging frame 40 having mounted therein the apron shaft 20 and another shaft 41 is pivotally suspended from links 42 depending from the main frame. The drum 38 is rigidly connected to and turns with the shaft 20 while the drum 37 is loosely mounted on the shaft 41 and acts as an idler drum. Transverse boards 43' connect the two sides of the swinging frame together and serve as a backing for the endless apron. The pivotal connection of the swinging apron frame 40 to the casing of the machine and the linked connection with the compression shaft 18 permits the apron to yieldingly bear on the material passing between the conveyer and the said apron.

The main drive shaft 12 is provided with a fly wheel 43 and a belt drive wheel 44 on one side of the main frame and with a pinion 45 on the shaft extending through the casing on the other side of the casing. A swinging gear frame 46 having pinions 47 and 48 and gear 49 mounted thereon is pivotally supported on the main drive shaft 12. The gear 49 is in constant mesh with the main drive shaft pinion 45 and the pinion 48 which is rigidly mounted on the same shaft which carries the gear 49 is in constant mesh with the pinion 47. The pinions 47 and 48 are interchangeable in order to change the speed of the parts and are provided with clutch faces for that purpose. A large internal gear 50 carried by the shaft 17 extends over or incloses the pinions 47 and 48 and either one of the said pinions is adapted to be swung into mesh with the internal gear depending upon the direction of movement of the feed desired. The gear frame is swung to move either pinion into mesh with the internal gear to change the direction of rotation of the internal gear by means of a reversing lever 51 which has a linked connection 52 with the gear frame 46. When the reversing lever is swung to the right, as shown in the drawings, the parts will rotate in a direction to feed material to the cutter, and when swung in the opposite direction the direction of feed will be away from the cutter, and when the handle is positioned in a medial position the reversing pinions will both be out of mesh with the internal gear and the feeding mechanism will be inoperative. The lever is provided with a spring 53 which holds said lever in the notched portions of the sector 54 fastened to the frame to hold said lever in adjusted position.

The compression roller shaft 17 and the conveyer shaft 32' are provided with gears 55 and 56 respectively and an idler gear 57 transmits motion from the gear 55 to the gear 56. The opposite end of the conveyer shaft 32' is provided with an adjustable arm 58 loosely mounted thereon which carries a stud shaft 59 on which is journaled a gear wheel 60 and a sprocket wheel 61 in clutched engagement with each other. The arm 58 is provided with a slotted segmental portion 62 through which extends a bolt 63 for fastening the arm in positions of adjustment. The end of the shaft 32' is also provided with a gear 64 rigidly connected thereto and which meshes with the gear wheel 60. A sprocket wheel 65 mounted on the shaft 18 and turning therewith derives its motion from a sprocket chain connection 66 with the sprocket wheel 61 and the adjustable arm 58 provides the means for taking up the stretch in said chain to compensate for the wear thereof. The opposite end of the shaft 18 and the shaft 19 are provided with sprocket wheels 67 and 68 respectively which are connected together by a sprocket chain 69, thus providing means for transmitting motion to the endless apron and permit it to freely swing up and down with the feed of the material.

The shaft 20 extends through openings 70 provided in the casing which are shaped to permit said shaft to swing in different arcs of movements without striking said casing. The casing is also provided with curved guide slots 71 through which the shaft 18 extends and is guided. These slots 71 are curved concentrically with relation to the shaft 20 when in its lowermost position so that the shaft 18 may swing upwardly when said shaft 20 is in its said lower or other positions.

The swinging apron frame is provided with a screw adjustment means 72 for tightening the apron 34.

In the operation of the machine material dropped upon the endless conveyer will be carried thereby beneath the yielding or floating apron which will tend to draw the material into the casing of the machine and at the same time compress it so it will easily pass into engagement with the compression and feed rolls and be further compressed thereby into a compact mass and then fed to the cutter which will cut it into small pieces. The floating apron and the yielding compression rolls will feed the varying quantities of material dropped on the conveyer and if the machine should become clogged the operator can momentarily reverse the direction of feed by swinging the reversing lever without stopping the operation of the cutter and thus clear the machine and as soon as the machine is clear the lever may be swung back to continue the feed. If it is desired to stop the feed of the machine it is only necessary to swing the lever to an intermediate position to disengage both pinions from the internal gear when the feeding mechanism will become inoperative without interfering with the operation of the cutter.

As the conveyer extends out of the casing beyond the path of movement of the feed rolls and the cutter there is no danger of the operator becoming accidentally injured by coming in contact with the cutter or feed rolls.

From the foregoing description it will be seen that the feeder is simple in construction and operation and is inexpensive to manufacture and maintain.

What I claim as my invention is:

1. A self feeder comprising a frame, an endless conveyer mounted upon the frame, a rotatable apron positioned above the conveyer and swingingly mounted on the frame to move vertically and longitudinally thereof, feed rolls mounted on the frame, and means connecting one of said rolls and the lower end of the apron to permit said roll and apron to be moved on the frame and relative to each other.

2. A self feeder comprising a frame, an endless conveyer mounted upon the frame, a rotatable apron positioned above the conveyer and swingingly mounted on the frame to move vertically and longitudinally thereof, feed rolls mounted on the frame, and a link connection between one of said rolls and the lower end of the rotatable apron to permit said roll and apron to be moved on the frame and relative to each other.

3. A self feeder comprising a frame, an endless conveyer mounted upon the frame, a rotatable apron positioned above the conveyer, said apron being mounted on upper and lower drums, means for pivotally and swingingly mounting the lower drum and one of said feed rolls, said roll and apron being free to move with respect to the frame and to each other.

4. A self feeder comprising a frame, an endless conveyer mounted upon the frame, an apron-frame swingingly mounted on said frame, a rotatable apron mounted on the apron-frame to move vertically thereof, feed rolls mounted on the frame, and means connecting one of said rolls and lower end of the apron to permit said rolls and apron to be moved with respect to the frame and relative to each other.

5. A self feeder comprising a frame, an endless conveyer mounted upon the frame, an apron-frame swingingly mounted on said frame, a rotatable apron mounted on the apron-frame and movable with respect thereto, feed rolls mounted on the frame, a link connecting one of said feed rolls and the lower end of the apron to permit said roll and apron to be moved with respect to the frame and to each other, and yielding means connected to said roll whereby said roll and apron will be yieldingly supported.

In testimony whereof, I affix my signature, in presence of two witnesses.

PAUL KLUMB.

Witnesses:
M. J. KWEKKEBOOM,
WM. H. GRUBE.